Patented June 2, 1925.

1,540,664

UNITED STATES PATENT OFFICE.

KARL THIESS, OF LINDLINGEN, NEAR HOECHST-ON-MAIN, GERMANY, ASSIGNOR TO FARBWERKE VORM. MEISTER LUCIUS & BRUNING, OF HOECHST-ON-MAIN, GERMANY, A CORPORATION OF GERMANY.

MONOAZO DYESTUFF.

No Drawing.  Application filed October 8, 1923. Serial No. 667,409.

*To all whom it may concern:*

Be it known that I, KARL THIESS, a citizen of Germany residing at Lindlingen, near Hoechst-on-Main, Germany, have invented certain new and useful Improvements in Monoazo Dyestuffs, of which the following is a specification.

Monoazodyestuffs from aminobenzaldehydes have hitherto been prepared only as intermediate products for dyes, but they have not been particularly described. They have not yet been industrially used as such, because it has probably been supposed that the free aldehyde group in these dyestuffs has an injurious influence upon the fastness, stability, etc. of these monoazo-dyestuffs. For these reasons several attempts have been made to render the said aldehyde group innocuous, that is to say to cover it for instance by acting on it with phenylhydrazine-sulfonic acids or hydrazine (compare D. R. P. 85233, 90357, 91817).

I have now made the observation that by causing the diazo-compounds of m-aminobenzaldehydes and their substitution products and also compounds capable of splitting off m-aminobenzaldehyde to act upon pyrazolones or their substitution products, hitherto unknown monoazo-dyestuffs are produced which have a free aldehyde group and give reactions characteristic thereof such as the formation of bisulfite compounds readily soluble in cold water and condensation with o-hydroxycarboxylic acids of the benzene and naphthalene series to leucotriarylmethane dyestuffs; are readily soluble in hot water and dissolve in concentrated sulfuric acid with a yellowish-green to orange-yellow color; dye evenly reddish-yellow to greenish-yellow tints, and give in an acid bath dyeings of pure tints which are very fast to light and alkalies and also possess a very great fastness to water and to washing which is much better than that of the hitherto known yellow equalizing dyestuffs of the pyrazolone series.

The dyestuffs are represented by the following general formula:

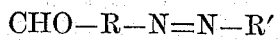

in which R stands for a benzene residue which may be substituted in any way and contains the aldehyde group in m- position and R' stands for arylpyrazolones, their derivatives and substitution products.

The following examples illustrate my invention:

1.) 36,3 kg. of m-aminobenzaldehyde in the form of its hydrochloride are dissolved in water; this solution having been diazotized in the known manner by a solution of 20,7 kg. of sodium nitrite in 150 litres of water at a temperature of 0–5°, the mixture is coupled as usual with a solution of 85,2 kg. 1-p-sulfophenyl-5-pyrazolone-3-carboxylic acid in 600 litres of water and 40 kg. of calcinated sodium carbonate at 0–5°. The formation of the dyestuff at once takes place and comes to an end after a short stirring at 20–25°. The dyestuff is entirely salted out by common salt; it dyes wool in an acid bath pure yellow tints with a green hue and is also extremely fit for wool-printing.

The dyestuff has probably the following formula:

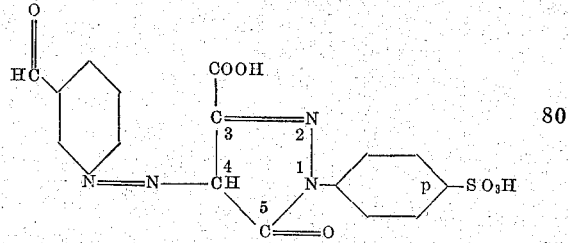

2.) If in Example 1 the m-aminobenzaldehyde is replaced by 46,2 kg. 2-chloro-5-amino-benzaldehyde, a dyestuff is obtained giving somewhat redder tints.

3.) By replacing in Example 1 the sulphophenyl-pyrazolone-carboxylic acid by 76,2 kg. of 1-p-sulphophenyl-3-methyl-5-pyrazolone, a dyestuff is obtained which dyes pure yellow tints and possesses a particular fastness to light.

4.) By replacing the 1-p-sulphophenyl-5-pyrazolone-3-carboxylic acid (Example 1) by 89,4 kg. 1-(4¹-sulpho-2¹-tolyl) 5-pyrazolone-3-carboxylic acid, a monoazodyestuff is produced giving greenish-yellow tints.

5.) 46,2 kg. of 2-chloro-5-aminobenzaldehyde are diazotized as usual and combined to a monoazodyestuff in the known manner with 52,2 kg. 1-phenyl-3-methyl-5-pyrazolone dissolved in 600 litres of water and 36 kg. caustic soda. The dried dyestuff when treated with concentrated sulphuric acid can be easily transformed into a sulfonic acid easily soluble in water and dyes wool in an acid bath yellow tints. Practically it is identical with the yellow dyeing-dyestuff obtained from 2-chloro-5-aminobenzaldehyde and 1-p-sulphophenyl-3-methyl-5-pyrazolone.

Instead of the m-aminobenzaldehydes there may also be used compounds splitting off aldehyde such as oximes, hydrazones or aldazines. Instead of the pyrazolone derivatives cited in the examples there may as well be used e. g. halogen derivatives, such as $2^1$-chloro-$5^1$-sulphophenyl-3-methyl-5-pyrazolone or hydroxyderivatives such as 1($5^1$-sulpho-$3^1$-carboxy-$2^1$-hydroxy) phenyl-3-methyl-5-pyrazolone.

6.) 46,2 kg. of 4-chloro-5-aminobenzaldehyde are diazotized as usual and coupled at 0,5° with a soda alkaline solution of 76,2 kg. of 1-p-sulfophenyl-3-methyl-5-pyrazolone. The formation of the dyestuff sets in at once. The dyestuff after being isolated by salting out forms when dry a reddish-yellow powder which dyes wool in an acid bath fast neutral yellow tints.

7.) 20,1 kg. of 5-amino-2-sulfobenzaldehyde are diazotized as usual with 6,9 kg. of sodium nitrite and coupled at 0,5° C. with a soda alkaline solution of 25,4 kg. of 1-p-sulfophenyl-3-methyl-5-pyrazolone. There results a deep yellow colored solution, from which the dyestuff may be isolated by salting out. It forms when dry a light yellow powder which is already easily soluble in cold water and dyes wool in an acid bath fast pure yellow tints.

8.) If in Example 1) are used instead of the 1-sulfophenyl 5-pyrazolone-3-carboxylic acid 90 kg. of 1-$4^1$-sulfo-α-naphthyl-3-methyl-5-pyrazolone, a very fast dyestuff is obtained dyeing brownish-yellow tints.

The dyestuff has probably the following formula:

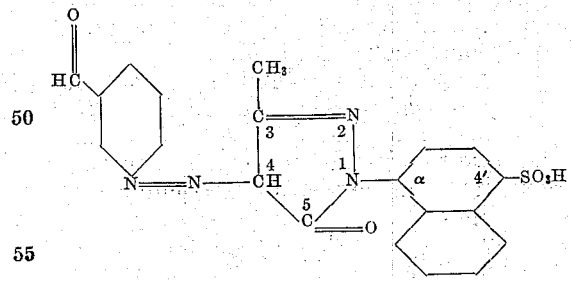

9.) 12,1 kg. of m-aminobenzaldehyde or 11,2 kg. of the anhydro compound of m-aminobenzaldehyde are diazotised as described with 6,9 kg. of sodium nitrite, and the diazo solution is combined at 0-5° with a soda alkaline solution of 51,5 kg. 1-($5^1$-sulfo-$3^1$-carboxy-$2^1$-hydroxy)-phenyl-3-methyl-5-pyrazolone (of 61 per cent). At once the formation of the new azo dyestuff takes place, the solution takes a deep yellow colour. The dyestuff may be precipitated by means of common salt from its solution as sodium salt. When dry, it constitutes a yellow powder and dyes wool in an acid bath very pure yellow tints with a green hue of good fastness to alkali, steaming and sulphur, and of a very good fastness to washing, fulling and water. By chroming it afterwards the dyeing becomes somewhat darker and then surpasses the well-known mordanting-yellow O as well as regards its green hue as also especially concerning the fastness to carbonization.

10.) If in Example 9 the pyrazolone-derivative mentioned therein is replaced by 35,3 kg. of $2^1$-$5^1$-dichloro-$4^1$-sulfophenyl-5-pyrazolone-3-carboxylic acid, a dyestuff is obtained which dyes very pure greenish-yellow tints.

Having now described my invention, what I claim is:

As new products the dyestuffs which dye wool greenish-yellow to reddish-yellow fast tints, and correspond to the formula:

$$CHO-R-N=N-R^1$$

wherein R means a benzene residue, which may be substituted in any way, containing the aldehyde group in m-position, and $R^1$ means arylpyrazolones, their derivatives and substitution products forming greenish-yellow to reddish-yellow powders readily dissolving in hot water, dissolving in concentrated sulfuric acid with a yellowish-green to orange yellow colour and containing the free aldehyde group, consequently showing the reactions characteristic for the said group, such for instance as the formation of bisulfite compounds which are very readily soluble in cold water, and condensation with o-hydroxycarboxylic acids of the benzene- and naphthalene series to leucotriarylmethane-dyestuffs.

In testimony whereof, I affix my signature.

KARL THIESS.

Witnesses:
M. W. ALTAFFER.
C. C. L. B. WYLES.